Patented Feb. 22, 1949

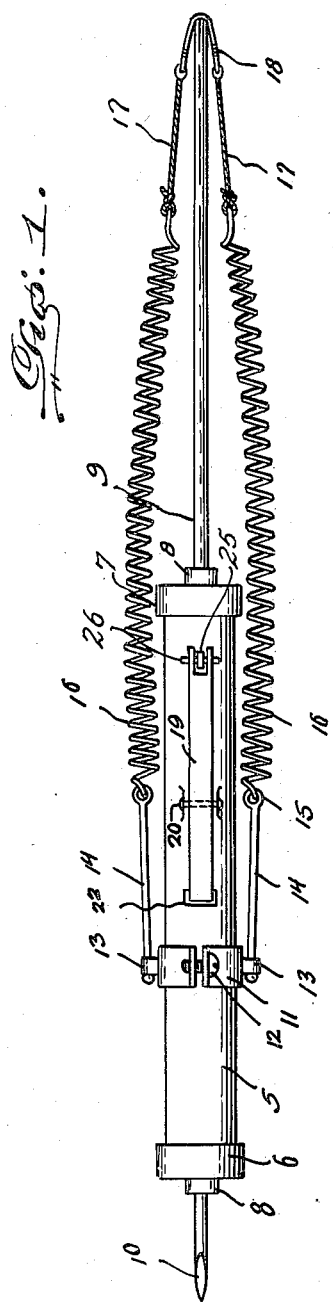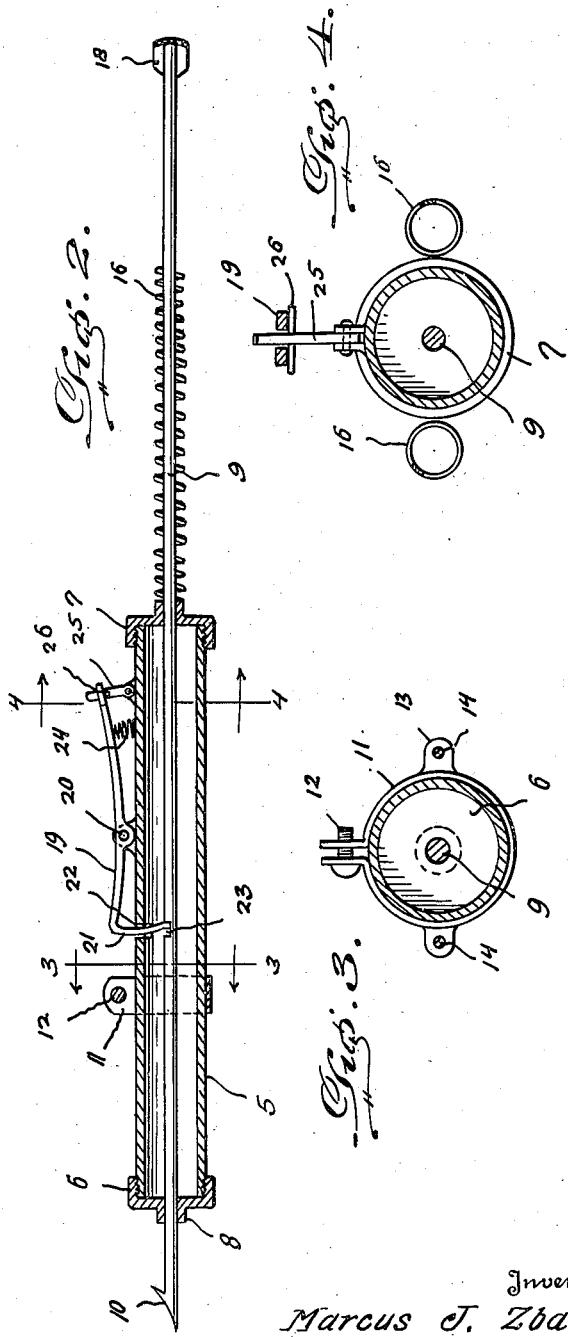

2,462,248

UNITED STATES PATENT OFFICE 2,462,248

SPEAR GUN

Marcus J. Zbar, Tampa, Fla.

Application September 11, 1944, Serial No. 553,625

2 Claims. (Cl. 124—26)

This invention relates to new and useful improvements in weapons and more particularly to a spear gun especially adapted for underwater fishing.

The principal object of the present invention is to provide a spring gun and spear especially adapted for underwater fishing wherein the parts are constructed and arranged for positive action.

Another important object of the invention is to provide a weapon of the character described which in operation will be substantially foolproof at all times.

Another important object of the invention is to provide a spear gun which has incorporated a safety factor to prevent accidental discharge of the device.

Other objects and advantages of the invention shall become apparent to the reader of the following description.

In the drawings:

Figure 1 represents a top plan view of the device.

Figure 2 is a longitudinal sectional view.

Figure 3 is a cross section on the line 3—3 of Figure 2.

Figure 4 is a cross section on the line 4—4 of Figure 2.

Referring to the drawings wherein like numerals designate like parts, it can be seen that numeral 5 denotes an elongated barrel of some light metal having screw caps 6, 7 at its front and rear ends. Each cap has an apertured boss 8 and disposed through the barrel and bosses 8 is an elongated rod or spear 9 having a barbed head 10 at its forward end.

A clamp 11 held in place by a screw 12 has apertured ears 13 at opposite sides of the barrel 5 and through these ears are disposed headed rods 14 each having an eye 15 at its rear end.

From each eye 15, an elongated coiled tension spring 16 extends to connect to a length of cord 17 and this cord, in turn, is connected to a sling 18 which engages the remaining end of the spear 9 in the manner substantially shown in Figures 1 and 2.

A trigger is provided for holding the spear until it is desired to release the same. This trigger consists of a rocker 19 fulcrumed as at 20 on the outside of the barrel 5. The forward end of the rocker 19 has an inwardly turned finger 21 operating through an opening 22 in the barrel 5. The free end of this finger 21 is intended to engage in a notch 23 in the forward portion of the spear 9.

A coiled compression spring 24 is interposed between the free end of the rocker 19 and the barrel 5 so as to hold the finger 21 engaged in said notch 23.

A safety device includes a short rockable arm 25 having a pin 26 laterally disposed from its upper portion and this is adapted to be forced into position under the free end portion of the rocker 19.

As can be seen in Figures 1 and 4, the rear end of the rocker 19 is bifurcated and the upper end of the arm 25 rides into this portion of the rocker 19 when the safety device is employed.

In the operation of the device, let is be assumed that the spear 9 is being held in the manner shown in Figure 2. The person who is to use the device, then goes under water and when he feels that he is in fishing territory, he releases the catch or safety 25. When he sees a fish he wishes to spear, he simply aims the gun and presses on the rear end of the rocker 19, thus releasing the finger 21 from the notch 23 to allow the contracting force of the spring 16 to project the spear 9 from the gun and to the fish.

While the foregoing specification sets forth the invention in specific terms, it is to be understood that numerous changes in the shape, size and material may be resorted to without departing from the spirit and scope of the invention as claimed hereinafter.

Having described the invention, what is claimed as new is:

1. A spear gun of the character described comprising an elongated barrel, a spear adapted to be projected through the barrel, a sling, spring connections between the sling and the barrel, said sling being adapted to engage the rear end of the spear, and trigger means between the barrel and the spear, said trigger means consisting of a rocker and a finger carried by the rocker for engaging a formation on the spear, said rocker having its free end bifurcated and a pivotal arm on the barrel provided with a cross pin, said arm being adapted to be swung into the bifurcated portion of the rocker with the cross pin engaging the underside of the rocker.

2. A spear gun of the character described comprising an elongated barrel, a spear adapted to be projected through the barrel, a sling for propulsive but detachable engagement with the rear end of the spear, a pair of parallel, longitudinally disposed spring connections between the sling and the opposite side portions of the barrel, trigger means located externally on the barrel and having a portion projected laterally into the barrel for releasable retentive engagement with the spear, and a split clamp secured surroundingly and longitudinally adjustable on the barrel and having the forward ends of the parallel spring connections secured thereto.

MARCUS J. ZBAR.

REFERENCES CITED

The following references are of record in the file of this patent:

UNITED STATES PATENTS

| Number | Name | Date |
|---|---|---|
| 1,297,344 | Glass | Mar. 18, 1919 |
| 1,526,176 | O'Connell | Feb. 10, 1925 |
| 1,542,159 | Maxwell | June 16, 1925 |
| 2,000,146 | Penn | May 7, 1935 |
| 2,078,439 | Blackledge | Apr. 27, 1937 |
| 2,301,789 | Pearson | Nov. 10, 1942 |

FOREIGN PATENTS

| Number | Country | Date |
|---|---|---|
| 355,712 | Germany | July 1, 1922 |